(12) United States Patent
McKee, Jr.

(10) Patent No.: US 7,489,445 B2
(45) Date of Patent: Feb. 10, 2009

(54) CONVERTIBLE AUTOSTEREOSCOPIC FLAT PANEL DISPLAY

(75) Inventor: William James McKee, Jr., Tiburon, CA (US)

(73) Assignee: Real D, Beverly Hills, CA (US)

( * ) Notice: Subject to any disclaimer, the term of this patent is extended or adjusted under 35 U.S.C. 154(b) by 698 days.

(21) Appl. No.: 10/769,129

(22) Filed: Jan. 29, 2004

(65) Prior Publication Data

US 2004/0263970 A1 Dec. 30, 2004

(51) Int. Cl.
*G02B 27/22* (2006.01)
(52) U.S. Cl. .................... 359/463; 359/462
(58) Field of Classification Search .......... 359/463, 359/462, 455, 457, 602, 608, 466; 348/59; 356/401
See application file for complete search history.

(56) References Cited

U.S. PATENT DOCUMENTS

| | | | | |
|---|---|---|---|---|
| 4,921,330 | A | * | 5/1990 | Takahashi et al. ............ 359/457 |
| 5,966,167 | A | * | 10/1999 | Nose et al. ..................... 348/59 |
| 6,519,088 | B1 | * | 2/2003 | Lipton ......................... 359/463 |
| 2003/0095333 | A1 | * | 5/2003 | Chen .......................... 359/608 |

* cited by examiner

*Primary Examiner*—Audrey Y Chang
(74) *Attorney, Agent, or Firm*—Smyrski Law Group, A.P.C.

(57) ABSTRACT

A display system is convertible between a planar display and a stereoscopic display. The system includes a flat panel display having a display surface. An alignment strip is affixed to the flat panel display proximate to the display surface. A lenticular screen is removably held in close proximity to the display surface by the alignment strip. An alignment method using software to generate test patterns ensures proper alignment of the lenticular screen the the display. A rotational pattern is displayed, and the user moves the pattern to align it with the lenticular slant. A vertical test pattern is displayed, and the user moves the pattern to center it within the display field.

4 Claims, 4 Drawing Sheets

CONVERTIBLE AUTOSTEREOSCOPIC FLAT PANEL DISPLAY

BACKGROUND OF INVENTION

The technology of autostereoscopic electronic displays, usually involving flat panels, has advanced to the point where it is now viable for many applications. Dedicated autostereoscopic displays are available but there are computer users who wish to have the ability to move between applications, for example, word processing and stereoscopic visualization applications. These users require a display that can provide a clear image for both autostereoscopic and planar applications. For displays using a lenticular selection device, the problem is that the refractive properties of the lens sheet fragment and/or distort small type and fine detail in the planar mode. Therefore, with the lens sheet remaining in place, the monitor or display cannot be used for important applications such as e-mail, spreadsheets, and word processing.

Many approaches have been considered for solving this problem. For example, consider a display utilizing an overlay such as a lenticular screen. With the lenticular ridges facing inward towards the flat panel surface, a chamber would be created between the flat panel surface and the lenticular ridges to hold a liquid that would be emptied to provide 3-D viewing and filled to defeat the refractive properties of the screen. This technique has been described in co-pending U.S. patent application No. 09/943,890, entitled Autostereoscopic Lenticular Screen.

Next, consider a display having a lenticular overlay in close contact with the flat panel front surface but with the ridges outward facing. To defeat the lenticular refractive characteristics, a mating inverse lenticular screen can be placed atop the lenticular screen in proper alignment so that the second screen will negate the refraction of the original, as described by Eichenlaub in U.S. Pat. No. 5,500,765, entitled Convertible 2D/3D Autostereoscopic Display.

The present disclosure provides a simpler approach by fabricating a removable lenticular screen that is held firmly in precision alignment when placed in juxtaposition with the flat panel in close contact with the display surface.

DETAILED DESCRIPTION OF THE INVENTION

Figure 1:
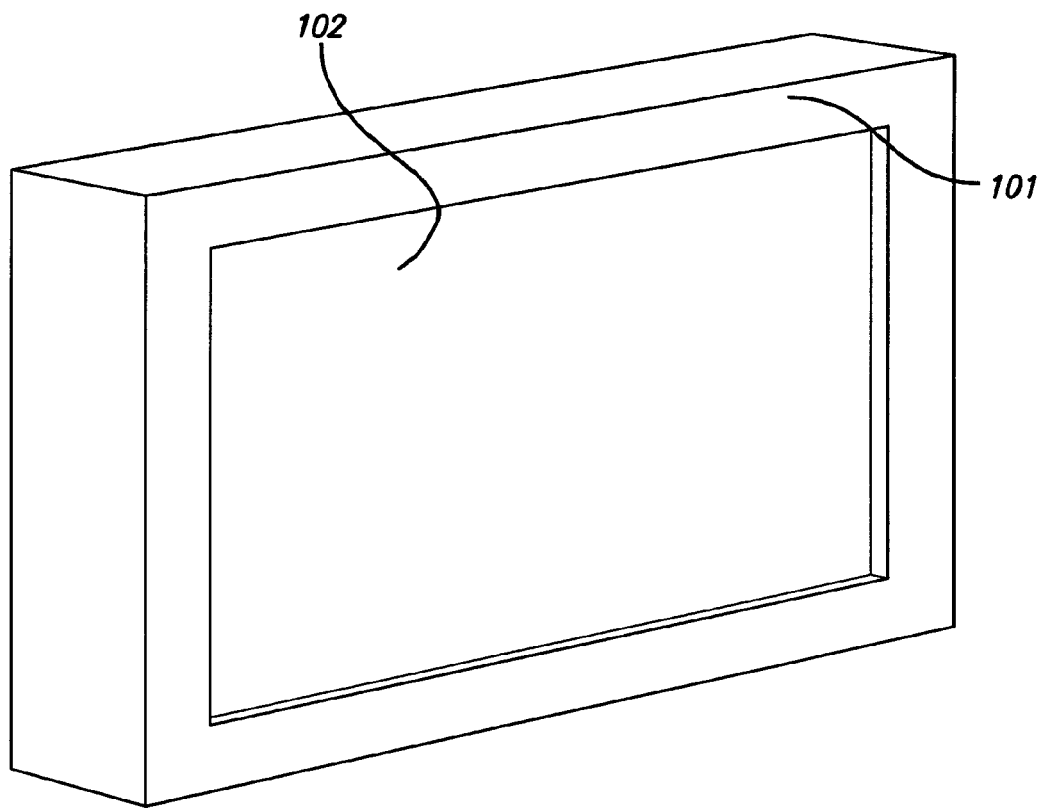
FIG. 1 is a front perspective view of a display without the lenticular sheet attached.

The present disclosure describes the design of a system to accomplish three-dimensional image viewing on a flat panel display. FIG. 1 shows the flat panel display 101. This display may be any one of a number of technologies presently known in the industry such as a plasma display, liquid crystal display, cathode ray tube, and so forth. The application of a lenticular screen atop the display surface 102, along with a software program used to encode the image data that is to be displayed, is key to the ability to show the images stereoscopically. Such an approach is described in co-pending U.S. patent application Ser. No. 09/876,630, entitled Autostereoscopic Pixel Arrangement, which is incorporated herein by reference.

The user ought to be able to utilize his or her flat panel display for both conventional computer applications in the two-dimensional mode and also make it possible to view stereoscopic three-dimensional renderings in proper relief without the need for an additional display. That is the raison d'etre for the present invention.

Figure 2:
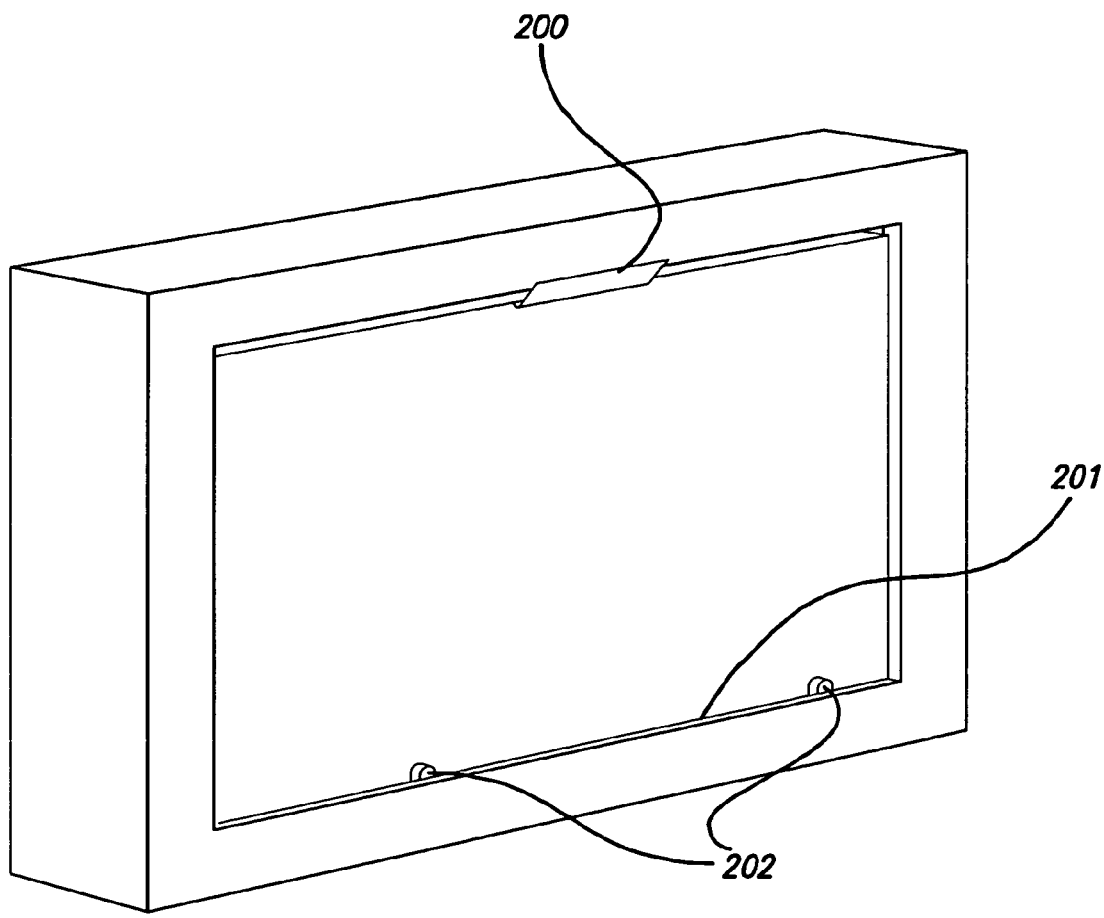
FIG. 2 is a front perspective view of the display showing mounting hardware for the lenticular sheet.

FIG. 2 shows the alignment hardware which provides a means for aligning and holding the lenticular screen in close proximity to the flat panel display front surface. Two schemes for attachment and alignment are considered. The alignment strips are held so as to restrict lateral movement with respect to the display front surface. The bottom alignment strip 201 is fabricated with one or more metal pegs 202, which are used for lateral positioning of the lenticular screen with respect to the display matrix. A preferred material for the pegs is stainless steel because of its strength and excellent dimensional properties, but without loss of generality, other materials may also be used. The number, size, and placement of the pegs correspond to the characteristics of the notches found in the bottom edge of the lenticular screen, said screen to be fitted to the display. The inner bottom surface of the alignment strip will also act to reference the bottom of the lenticular screen to the display's matrix of pixels in a fixed alignment.

The top alignment strip 203 comprises a sheet metal strip that is fabricated of a material that, when formed properly and fixed in place, can exert a downward pressure against the lenticular screen when the lenticular screen is inserted and placed in close juxtaposition with the display surface. The preferred material is, therefore, spring-like metal or other material with suitable characteristics. The use of a stainless steel spring is preferred due to its robust and non-tarnishing nature. For some flat panel displays, it may be preferable to use two side strips that maintain a space around the edge between the lenticular screen and the display surface; the purpose of such a space is to prevent the generation of Newton's Rings or other artifacts due to the two large area surfaces coming into contact. Such strips can be held in position by means of an adhesive or common mechanical fastener, such as screws or clips or other such fastening hardware. It is possible to have the top, bottom, and side metal strips all made in a single piece. The optical design may include a gap of any value between the display front surface cover material and the back surface of the lenticular screen or lenticular screen substrate. This can be a 5-micron spacing but may be changed to be quite large, say 2 or 3 mm or so, if necessary.

The lower alignment strip may be affixed to the metal frame that surrounds the edges of the display. It is adjusted to be precisely in line with the display matrix rows of pixels. The upper alignment strip is situated parallel to the lower one and placed at a distance to insure the correct fit of the lenticular lens sheet and the correct amount of downward spring pressure to insure proper seating of the screen into the lower alignment strip. This procedure assures that the lenticular screen will be consistently aligned to the display matrix every time it is put in place.

For field installation (as opposed to factory installation), the following approach may be used. The lower alignment strip includes a sheet metal strip that runs along the bottom of the display bezel opening and is fastened in place by application of adhesive or a mechanical means such as screws or clamps. The top alignment strip is held against the top of the bezel opening and close to the display front surface by either the application of an adhesive or mechanical means such as screws or a clamp, clasp or the like.

Figure 3A:
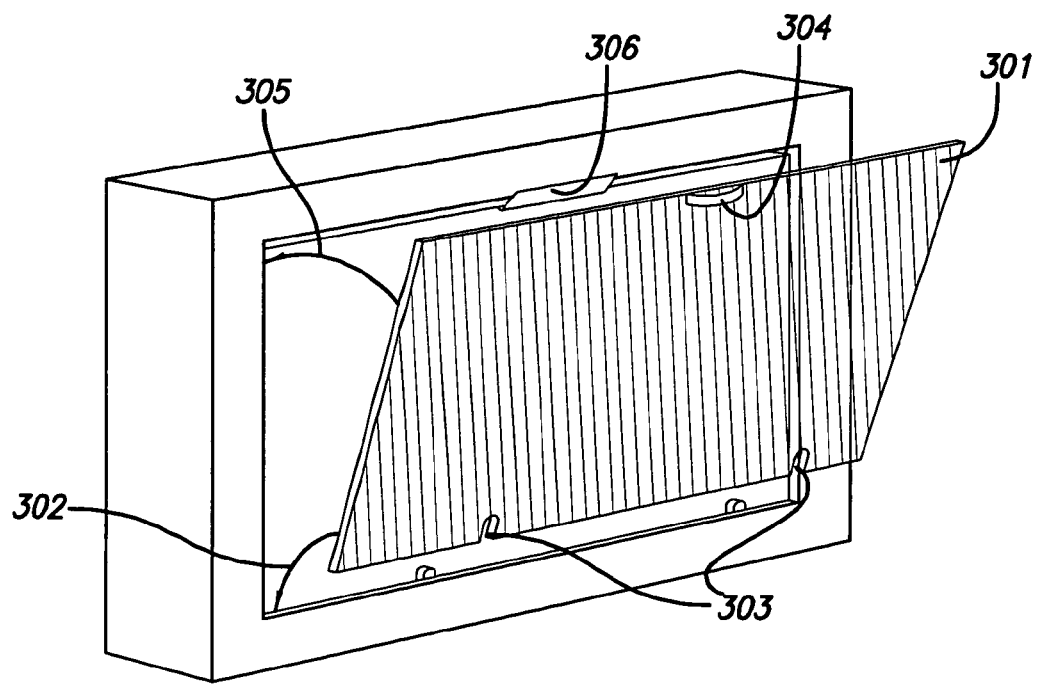
FIG. 3a is a front perspective view showing the lenticular screen being put into position.

FIG. 3(a) shows the placement of the lenticular screen 301 onto the display. The user makes certain that the lower groove in the alignment strip is clean and free of debris. The bottom edge of the screen is then inserted into the lower groove 302 of the bottom alignment strip. The lenticular screen shown here is made of a flat transparent substrate upon which a series of cylindrical lenses are formed, making it an optical array. Such lenticular sheets are well known in the art, and it is not the intent of this disclosure to describe these sheets in any detail. The lenticular screen utilized here is, however, significantly different in its physical characteristics with respect to the mounting scheme, and therefore included in the disclosure for those attributes: The screen is prepared for mounting by having at least one slot 303 cut into its lower edge (two are shown in this drawing). This slot is prepared for use as an alignment point by the application of a metal surround. The metal may be fashioned from sheet stock or machined from various materials as will be understood by one familiar with the mechanical arts. Within the side of the slot resides a flat ramp that is sprung to provide the lateral force necessary to initially align and then maintain the lateral (X-axis) alignment of the screen with respect to the display panel. The ramp is designed such that the peg of the bottom alignment strip moves easily into the slot but is snugly held against the side of the slot opposite the ramp. The bottom edge of the lenticular screen is fitted with a metallic strip that is intended to minimize wear and abrasion on that surface. This is the surface used for Z-axis alignment or the dimension that sets the distance of the rear surface of the lenticular screen from the front surface of the display.

The X-axis refers to the horizontal dimension of the display screen, as mentioned above, or to rows of pixels, and the Y-axis refers to the vertical direction or columns of pixels that make up the Cartesian matrix of the display. Therefore, it should be clear that the Z-axis, in the context of our disclosure, is perpendicular to the surface of the display screen.

The lenticular screen may be fitted with a metal surround completely around its periphery (excluding the opening of the slots) to provide a measure of edge protection. This is not essential but may be desirable with regard to the consideration of long-term wear. The top outside surface has resident a tab, flexible handle, finger-hold, or the like 304 to help the user in dismounting the screen from the display. Such finger-hold or appliance may be attached in an unobtrusive manner using adhesive or mechanical fasteners such as screws. Care is to be taken in providing this feature with a minimum occlusion of the image being displayed. The slot in the bottom of the lenticular screen moves over the peg on the alignment strip and engages it so as to assert a pressure toward on side of the slot surface. This insures the X-axis alignment.

As the top of the screen is brought to the surface 303 of the flat panel display 305, the top alignment strip 306 is flexed to accept the screen. As the screen comes to rest atop the front surface, the top alignment strip exerts a constant downward pressure on the top of the lenticular screen, holding it firmly against the bottom alignment strip and thereby insuring the Z-axis alignment of the screen with respect to the display.

The top alignment strip is fabricated so that it also acts to hold the screen inward in a manner similar to that of the bottom alignment strip. In order to release the lenticular screen from the display, the user must relieve the spring tension provided by the upper alignment piece, tilt the top of the sheet outward using the outward facing tab (or finger-hold), and pull it from the groove of the bottom alignment strip.

Figure 3B:
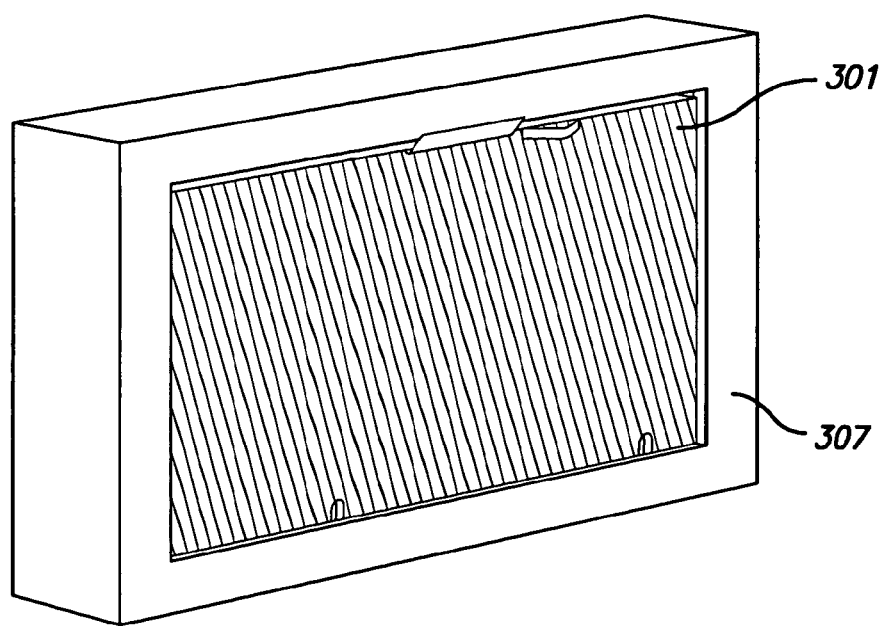
FIG. 3b is a front perspective view of the display with the lenticular sheet in place.

FIG. 3(b) shows the lenticular screen 301 as it has been positioned and placed onto the flat panel display 307.

The field installable or retrofitable autostereoscopic imaging kit is made up using the components given above. This kit enables users to add autostereoscopic-imaging capability to their existing flat panel display. The kit contains a lenticular screen prepared for a particular model of display along with the alignment strips and installation instructions. In order for this to be successful, it is required that the alignment of the lenticular screen to a particular flat panel be known by the computer program(s) used to generate image content.

It is necessary to insure proper alignment of the lenticular screen with respect to the display matrix. Upon physical placement of the lenticular screen in juxtaposition with the display matrix, the lower alignment strip is adjusted to insure proper Z-axis alignment (the slant of the lenticular ridges with respect to the display matrix columns). The strip is then adjusted so as to bring the center image into normal projection, i.e., projecting outward straight toward an observer that is centered in front of the display and whose eyes are at the same level as the vertical center of the display screen surface. This is accomplished during the manufacturing process placing the burden of exact alignment on the manufacturer rather than the user.

The alignment strips are fixed in place, and the lower strip may be adjustable as above, but the adjustments are external to the front edges of the strips, allowing this to be field installed and adjusted.

Figure 4A:
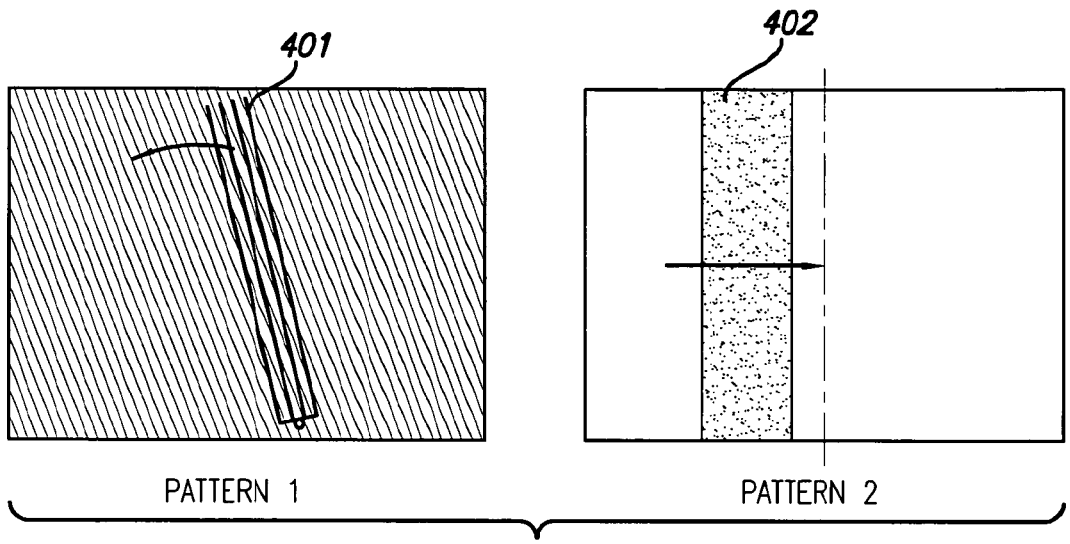
FIG. 4a illustrates the alignment pattern used with the alignment software.

The alignment strips are affixed and may not be adjustable, and the alignment is accomplished using a test image and a software application as follows. FIG. 4(a) is associated with the screen alignment software, a program complete with test patterns, that is used to facilitate the fitting of the lenticular screen to the flat panel display, either in manufacture or in the field. The software consists of a program that will provide test patterns to aid in configuring the image size, position, placement and Z-axis alignment information associated with the lenticular screen installed on the display. The information determined by the alignment phase of the installation is subsequently stored in the computer. This data is then used to provide an internal look-up table for the image rendering program in generating the image content required for that particular display and screen combination. With the rotational pattern (pattern 1) 401 being displayed, the user moves the mouse pointer to the top of the pattern, clicks on it, and moves it to precisely align the test pattern with the lenticular slant (this is the rotational angle of the lenticular stripes with respect to the display matrix vertical axis). Using the vertical color band (pattern 2) 402, the user clicks on the bar and moves it so that it is precisely centered within the display field.

Figure 4B:
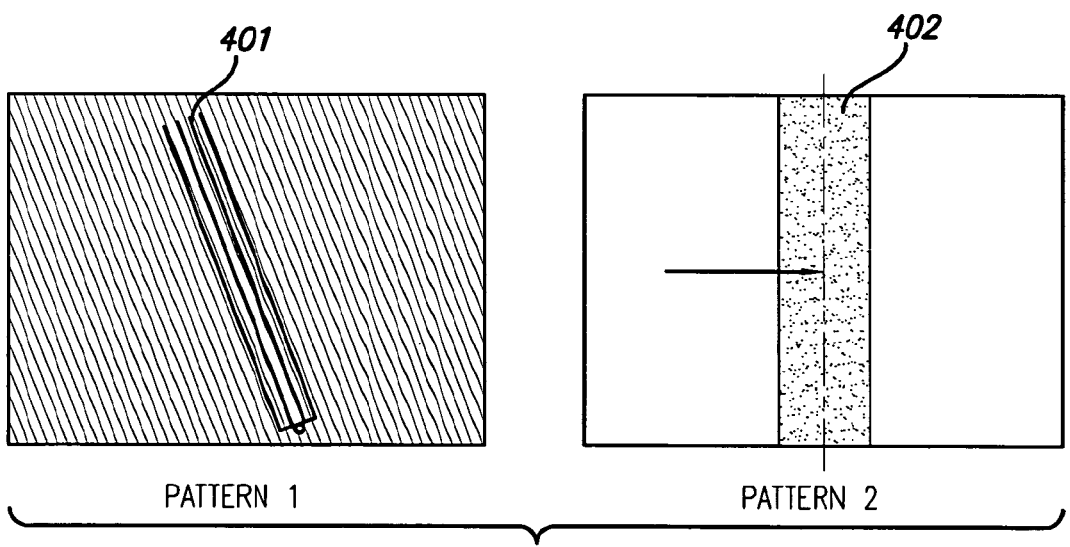
FIG. 4b illustrates the correct alignment of the alignment pattern.

FIG. 4b shows the patterns in proper alignment.

While the preferred display driving scheme is a digital drive (DVI) from the computer to the display, many systems exist that utilize an analog video output (typically termed RGB) using a 15 pin High Density D connector. The size and positioning adjustments for these systems uses the peripheral surround (both rows and columns) of the displayed image presented through the analog port as a guide for the user in setting up their display to match the output of the image programs that will present the three-dimensional images for display. Since the digital video (DVI directly from the computer) to the display is matched to the display size and resolution and its position is not subject to moving, the peripheral surround image should automatically show on the display as a single row of pixels on each side and the top and bottom of the image display area. For both the analog and digital systems, the software package generates a line pattern that is moved by the user through keyboard or mouse controls to align with the lenticular ridges of the screen (Z-axis alignment).

When the proper alignment is found, the user instructs the program to save this information, and the resultant slant of the screen that has now been measured is input to the computer for its use in subsequent image encoding tasks. Another pattern used by the software program is a color band that can be moved across the face of the display. The band is a bright color (yellow for example) and is somewhat narrower than the width of the display. With the user positioned directly in front-center at a comfortable viewing distance, he or she performs this portion of the alignment. The user moves the band to the center of the display, which indicates the X-axis alignment is optimal. The user now prompts the software to save this information and, as before, the computer stores this information to use for encoding the images to be shown in autostereoscopic relief on this display. The software program has a set of images that can now be displayed and viewed by the user as sample images with good three-dimensional characteristics, which will further confirm the quality of the alignment procedures just completed. The display is now completed and ready for use.

Although certain specific materials are called out in this disclosure, such as stainless steel, those familiar with the art will realize that there are substitutes that can be used without loss of generality, and the essence of these teachings is not confined to a particular recommendation with regard to materials. In addition, for didactic purposes, the mounting schemes described here are specific, and a person familiar with the art would be able to make minor and countless inconsequential variations which in no way would add to the art taught in this disclosure and would be, by their very nature, obvious.

Two basic approaches have been described for a convertible autostereoscopic display using interchangeable or removable lens sheets. With the lens sheet in place, the device functions in the autostereoscopic mode. With the lens sheet removed, the display functions in the planar mode. The first method is an approach that is meant to be manufactured and designed for ease of use for switching between autostereo and planar modes. The burden of calibration is assumed in manufacture and not by the user. The second method is one for flat panel displays that have no provision for conversion between autostereo and planar modes. It provides a way for the user to calibrate in the field by means of a software program used in conjunction with hardware (the lens sheet).

The invention claimed is:

1. An image display system that is convertible between stereoscopic and planar viewing modes, comprising:
   a flat panel display having a display surface;
   alignment hardware comprises an alignment strip affixed to the flat panel display proximate to the display surface;
   a lenticular screen removably held by the alignment hardware in a fixed position in juxtaposition with the display surface;
   a computer coupled to the flat panel display and adapted to provide image content to the display;
   a software program running on the computer and providing at least one test pattern displayed on the display surface which is capable of manipulation by a user to meet predefined criteria for alignment of the lenticular screen relative to the display surface
   wherein the alignment strip includes at least one peg and the lenticular screen includes at least one notch corresponding to the peg such that placement of the lenticular screen against the alignment strip causes the peg to mate with the notch.

2. An image display system as in claim 1, wherein the alignment strip includes a bottom alignment strip having at least one peg.

3. An image display system as in claim 1, wherein the alignment strip includes a top alignment portion and a bottom alignment portion, and wherein the lenticular screen is held firmly and precisely in place by the alignment portions.

4. An image display system as in claim 1, wherein the alignment strip includes side alignment portions and a bottom alignment portion, and wherein the lenticular screen is held firmly and precisely in place by the alignment portions.

* * * * *